United States Patent [19]

Pohlmann et al.

[11] 4,161,995
[45] Jul. 24, 1979

[54] LOUDSPEAKER HOUSING FORMING A CLOSED, DAMPED SYSTEM, PARTICULARLY FOR AUTOMOTIVE INSTALLATION

[75] Inventors: Gottfried Pohlmann, Schellerten; Egon Schneider, Hildesheim, both of Fed. Rep. of Germany

[73] Assignee: Blaupunkt-Werke GmbH, Hildesheim, Fed. Rep. of Germany

[21] Appl. No.: 822,949

[22] Filed: Aug. 8, 1977

[30] Foreign Application Priority Data

Aug. 20, 1976 [DE]  Fed. Rep. of Germany ....... 2637487

[51] Int. Cl.² .......................... H05K 5/00; G10K 10/00
[52] U.S. Cl. .................................... 181/150; 181/141; 181/149; 181/151; 181/199; 181/DIG. 1
[58] Field of Search ............... 181/150, 151, 155, 148, 181/149, 199, 141, DIG. 1; 179/1 VE

[56] References Cited

U.S. PATENT DOCUMENTS

| | | | |
|---|---|---|---|
| 1,837,755 | 12/1931 | Carlisle et al. | 181/151 |
| 2,821,260 | 1/1958 | Shaffer | 181/150 |
| 3,666,040 | 5/1972 | Junk | 181/150 |
| 3,746,125 | 7/1973 | Hammes | 181/199 |
| 3,993,345 | 11/1976 | Croup | 181/150 |
| 4,056,165 | 11/1977 | Okamoto et al. | 181/150 |
| 4,057,689 | 11/1977 | Stallings, Jr. | 181/150 |

FOREIGN PATENT DOCUMENTS

| | | | |
|---|---|---|---|
| 143160 | 9/1951 | Australia | 181/149 |
| 1229451 | 4/1971 | United Kingdom | 181/DIG. 1 |

*Primary Examiner*—Stephen A. Tomsky
*Attorney, Agent, or Firm*—Frishauf, Holtz, Goodman & Woodward

[57] ABSTRACT

The loudspeaker is mounted within a hollow, essentially tubular body so that the loudspeaker structure extends into the tubular body. The tubular body is at least in part insertable into an opening of a vehicle panel, such as a dashboard, rear window shelf, or the like. The rear of the panel is closed off by a housing body, shaped to leave a space or chamber behind the tubular body; preferably, the housing body is made of a foam material, or includes, at the inside, a foam rubber material which may be of open pore structure at least in the region facing the tubular body.

19 Claims, 3 Drawing Figures

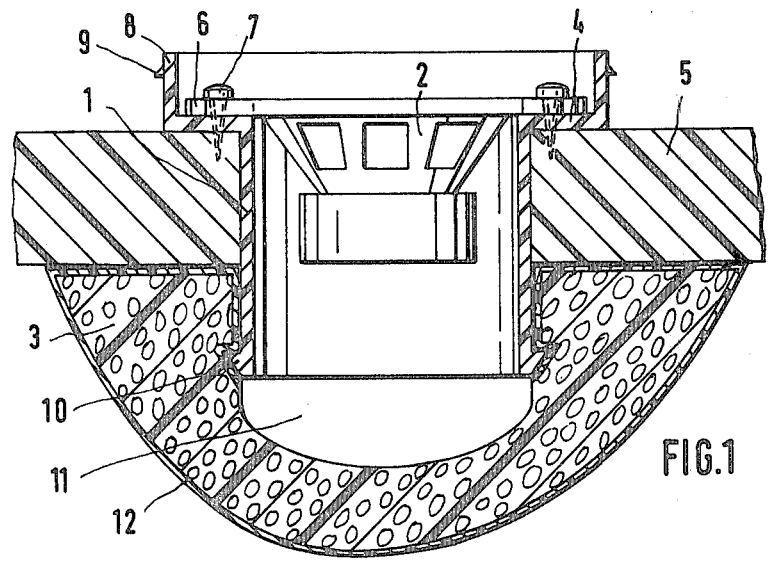
FIG.1
FIG.2
FIG.3
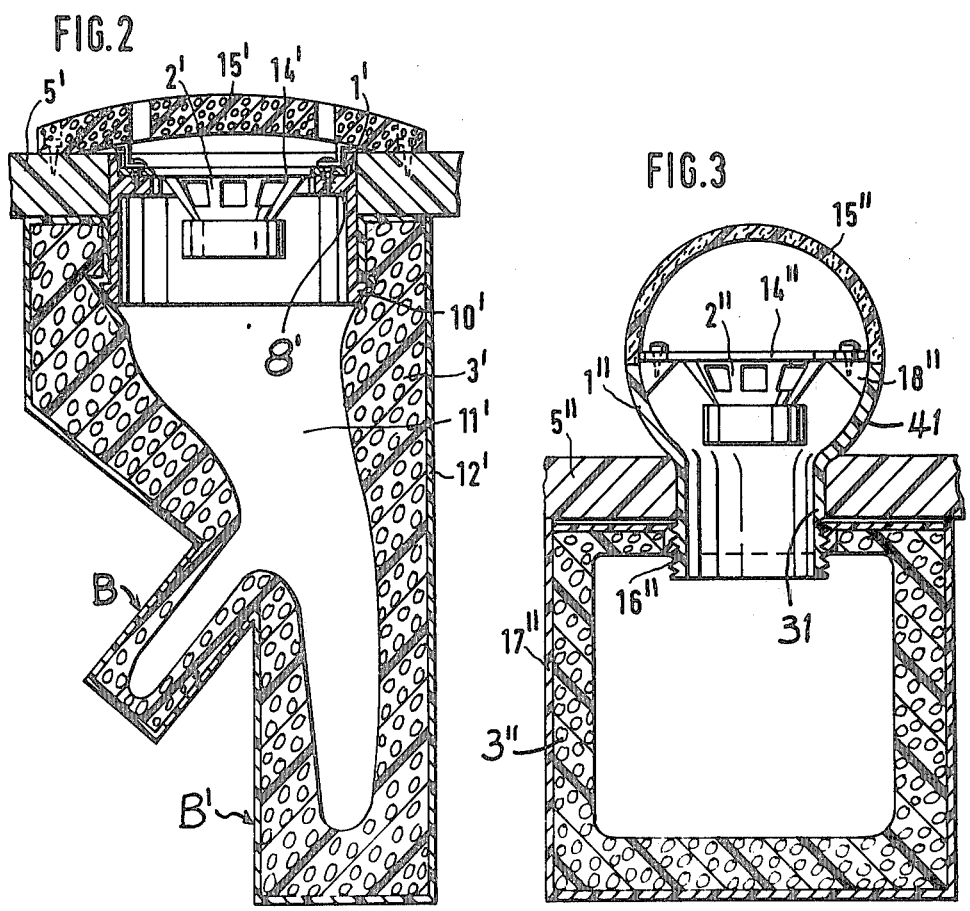

LOUDSPEAKER HOUSING FORMING A CLOSED, DAMPED SYSTEM, PARTICULARLY FOR AUTOMOTIVE INSTALLATION

The present invention relates to a loudspeaker housing for a closed, damped system in vehicles and intended for use behind covers, shields, or panels.

BACKGROUND AND PRIOR ART

As is well known the fidelity of reproduction of all current loudspeaker housings suited for use within vehicles is not nearly as good as the fidelity of reproduction of loudspeaker enclosures for both home and studio equipment. High-quality broadcast receivers and tape reproducers for both mono and stereo reproduction and designed especially for vehicles are available. Yet, sound reproduction suffers due to the poorer loudspeaker response.

Known loudspeaker housings for use in vehicles usually consist of housings of synthetic material screwed on a panel disposed in the vehicle, e.g. a door panel, rear window shelf, or the like. These known arrangements have the disadvantage that only loudspeaker housings of comparatively small volumes can be utilized because of the restricted space in a vehicle; and it is nearly impossible to install loudspeaker housings having closed, damped systems.

A closed, damped system is hereinafter understood to mean a system comprising at least one loudspeaker and a housing wherein the acoustic waves caused by the loudspeaker diaphragm die away already within the absorption material of the housing. A loudspeaker system with highly elastic suspension of the diaphragm shall mean a system wherein substantial components of the restoring force for the diaphragm of the loudspeaker are supplied by an enclosed air volume and not by spring or other resilient elements of the loudspeaker.

The high quality of the loudspeaker enclosures for home and studio apparatus is primarily achieved by utilizing loudspeaker housings for closed, damped systems; loudspeakers are of the highly elastic suspension type of the oscillating system of the woofer.

SUBJECT MATTER OF THE PRESENT INVENTION

It is an object to develop a loudspeaker housing for use in vehicles and with considerably improved fidelity of reproduction compared to known arrangements, i.e. the loudspeaker housing should be suited for use with a closed, damped system with highly elastic suspension of the loudspeaker oscillating system.

Briefly, the loudspeaker housing consisting of two elements, one a hollow body at least partly insertable in an opening of a panel cover, or the like, and the other a housing body capable of being attached to the hollow body on the rear side of the panel or the like. The hollow body is provided with fastening means for the loudspeaker.

This arrangement offers the possibility of utilizing the spaces to be found below a rear window panel, behind an instrument panel, behind door and wall panels, and the like, for incorporating a loudspeaker housing in a closed, damped system with a sufficiently large volume. The hollow body extends through an opening of such a panel. The housing body which may be, e.g. a body of foamed plastic material, is assembled onto the hollow body from the rear so as to form a substantially airtight connection.

No disturbing obstructions which might restrict view and space in the visible interior space of the vehicle will result. The opening in the panel receiving the loudspeaker housing need not exceed the dimensions of a loudspeaker.

The hollow body may have the most diverse forms, and, consequently, the loudspeaker housing is suited to receive all types of loudspeakers available on the market. The loudspeaker housing can be easily mounted and the loudspeaker secured to the housing by simple means.

In an advantageous embodiment of the present invention, the lower portion of the hollow body is cylindrical and its upper portion widens. It is possible to adapt the widened portion of the hollow body to the various types of loudspeakers, though the diameter of the cylindrical portion is constant, thus permitting equi-dimensional openings in the panels of all vehicles.

The volume of the loudspeaker housing according to the present invention can be favorably matched to the respective loudspeaker.

Drawings, illustrating an example:

FIG. 1 is a cross-sectional view showing a loudspeaker housing consisting of both a hollow body, matched in its form and dimensions to an associated loudspeaker, and a housing body, which is a body of foamed plastic material;

FIG. 2 is a cross-sectional view showing a loudspeaker housing comprising both a hollow body whereinto a respective loudspeaker is insertable, and a housing body, which is of foamed plastic material and has tubular form;

FIG. 3 is a cross-sectional view showing a loudspeaker housing comprising both a hollow body, consisting of a semi-spherical upper portion and a cylindrical lower portion, and a housing body, formed by an inherently stable body of synthetic material and capable of being screwed on the hollow body so as to establish an almost airtight connection.

As illustrated in FIG. 1, the loudspeaker housing comprises two housing elements. One element is a sleeve-like hollow body 1, for example of plastic material, the cross-sectional area of which corresponds in the form and dimensions to the measures of the rear portion of an associated loudspeaker 2, i.e., the hollow body 1 which is dimensionally and form stable has a round cross-sectional area, when being utilized for round loudspeakers, and an oval cross sectional area, when being intended for oval loudspeakers. The other housing element 3 includes a housing body formed by a body of foamed plastic material.

A circumferential flange 4 is disposed on the upper end of the hollow body 1. Flange 4 upon insertion of the hollow body 1 into a matching opening of a panel 5, tightly rests against the surface of panel 5. When the loudspeaker 2 is being installed, its fastening means, i.e. attachment flanges 6, wherein holes are disposed, contact the circumferential flange 4 of the hollow body 1, and the loudspeaker 2, the hollow body 1, and the covering 5 can be connected to each other by screws 7.

An upright circumferential sidewall 8 is formed on the periphery of the circumferential flange 4, and provided at its outside with catch hooks or prongs 9. A loudspeaker covering (not illustrated) can be fastened to this sidewall 8.

The length of the hollow body is dimensioned so that the latter extends through the panel 5 and beyond, to protect the speaker. The body of foamed plastic material 3 is capable of being attached from the rear onto the hollow body 1 so as to establish an almost airtight connection. To better attach the fastening of the body element of foamed plastic material 3, the rear portion of the hollow body 1 is provided with an external bead 10, prongs, or similar projecting means engaging the foamed material 3.

The body of foamed plastic material 3 serving in this embodiment of the present invention as the second housing element has a flat surface and, consequently, provides large contact surfaces at the bottom part of the covering 5. Adhesives may also be used to secure body 3 to panel 5 and/or to body 1.

The body of foamed plastic material 3 has a hollow space 11 in the vicinity of the rear end of the hollow body 1. At least those portions of the body of foamed plastic material 3 adjacent to the hollow space 11 have open pores. It is, however, equally possible that the whole body of foamed plastic material 3 has open pores, except for an airtight outer covering 12. If the walls of the body of foamed plastic material 3 are sufficiently thick to cause the maximum oscillations radiated into the rooms behind the loudspeaker by the diaphragm of the respective loudspeaker 2 to die away within the foamed plastic material serving as the absorption material, an airtight outer covering 12 for the body of foamed plastic material 3 can be omitted. In this case, too, the described loudspeaker housing forms, together with the respective loudspeaker 2, a closed, damped system according to the above definition.

In the embodiment of the present invention illustrated in FIG. 2, the loudspeaker housing consists of both a hollow body 1', the dimensions and shape of which are such that a respective loudspeaker 2' is capable of being completely inserted thereinto, and a body of foamed plastic material 3' of tubular form which can be slid onto the hollow body 1'.

The hollow body 1' is formed with a circumferential inwardly projecting flange 8'. The loudspeaker 2' is fastened with the edge of its loudspeaker chassis frame 14' to the circumferential flange 8'—if required, with a gasket interposed. With the exception of a bead 10', the hollow body 1' has no externally projecting parts and its cross sectional area remains the same over its total length. As a result, the hollow body 1' is completely insertable into the opening of the panel 5'. The hollow body 1' is secured to the panel 5' in such a way that a loudspeaker covering 15' for example a perforated dome of plastic material extending beyond the edge of the opening of the panel 5' is fastened to both the hollow body 1' and the panel 5' of the vehicle.

In this embodiment, the body foamed plastic material 3' is slid from the rear over the bead 10' and the rear portion of the hollow body 1' so as to establish an effectively airtight connection. The body 3' is deformable and of nearly tubular form. If desired, it can also be provided with several branches of which two are shown at B and B' to increase its volume. As a result, there is the possibility of utilizing even narrow, angular and possibly unused, and almost inaccessible spaces existing below a panel in a vehicle for incorporating a loudspeaker housing.

The body of foamed plastic material 3', is provided with a hollow elongation 12, at the end portion thereof. The hollow space 11' extends in form of a tubular prolongation B' to the rear portion of the body 3'. A sufficiently large effective air volume for the associated loudspeaker is thereby provided even if there is only restricted space.

The structure of the body 3' is similar to that of the body 3 in the embodiment of FIG. 1, except for its shape.

FIG. 3, third embodiment: The hollow body 1" comprises a cylindrical lower portion 31 and a widening, preferably semispherical upper portion 41. The widening of the hollow body 1" permits matching to various types of loudspeakers, though the diameter of the cylindrical portion 31 is the same. As a result, it is possible to provide the panels of vehicles with standard size openings yet receive different types of loudspeakers. The lower end of the body 1" is threaded at 16". The body 1, 1', 1" is preferably a plastic material injection molded part.

A reinforcement flange 18" is formed in the front section of the semispherical portion 41 of the hollow body 1". The reinforcement 18" forms an annular plane bearing surface for the loudspeaker chassis frame 14" of loudspeaker 2". The loudspeaker 2" can thus be screwed on the hollow body 1" to establish an airtight connection. A nearly semispherical loudspeaker covering 15" of perforated or porous plastic is clamped onto the loudspeaker chassis frame 14" and, if required, fastened to the hollow body 1" by further attachments.

The semispherical portion of the hollow body 1" can be so arranged that its end face is directed not in the upward direction as shown, but to the front (that is, laterally, or in the plane of the drawing), thus providing for sound to radiate to the front or side.

The body 3" of foamed plastic material has a mechanically strong skin 17"; preferably it is of angular cross section, e.g. rectangular, and has a plane front. Skin 17" has an inturned upper end which engages the screw threads on the hollow body 1", so that it will rest against the bottom of a panel 5", and clamp the hollow body 1" in the opening of the panel 5". The interior space of the body 17" is at least partly lined with a suitable absorption material and forming body 3". The body 3" together with skin 17" can be a unitary plastic, form-stable element.

The loudspeaker housing 3" of FIG. 3 is especially suited for installation below the rear window panel of an automobile, since there will usually be sufficient space for receiving the comparatively large non-deformable body of plastic material element formed by a unit comprising body 3" and skin 17".

The three embodiments of loudspeaker housings readily provide closed, damped systems. By suitably dimensioning the hollow bodies 1, 1', 1" as well as the hollow spaces of the housing bodies, predetermined volumes can be obtained, so that the air volume can be optimally matched to the respective loudspeaker.

The present invention is, of course, not restricted to the three described embodiments. The hollow bodies as well as the housing bodies may also have other forms in order to meet technical or appearance requirements.

Various changes and modifications may be made, and features described in connection with any one of the embodiments may be used with any of the others, within the scope of the inventive concept.

We claim:

1. A vehicle loudspeaker housing for combination with and to receive and hold a loudspeaker, intended for installation on a panel, cover or the like formed with an opening therein comprising two separate, connectable housing elements, one element comprising a hollow open sleeve-like dimensionally and form stable essentially tubular element (1, 1', 1"), insertable and fitting in the opening of the panel (5, 5', 5") having two open ends and dimensioned to laterally sourround the loudspeaker, means located at one end of said tubular element extending laterally therefrom to overlap the panel;

means to attach said tubular element to the panel;

attachment means (4, 8', 18") for the loudspeaker (2, 2', 2"), formed on said tubular element at one end thereof, the loudspeaker, upon attachment, closing off said one end, and the second element comprising a housing body element (3, 3', 3") having an essentially airtight covering and foamed plastic material located therein, engaged over the circumference of the outside of the hollow sleeve-like tubular element (1, 1', 1") on the rear side of the panel (5, 5', 5") at the other end thereof, said housing body element having a closed end section and forming a chamber (11, 11') behind said hollow sleeve-like body; and cooperating connecting means disposed at the rear side of the panel and towards the other end of the tubular element (1, 1', 1") to firmly and essentially air-tightly secure the housing body element and the tubular element together to form a closed, damped system.

2. A loudspeaker housing according to claim 1, wherein the tubular element (1, 1', 1") is made of plastic material.

3. A loudspeaker housing according to claim 1, wherein the tubular element fits in the opening of the panel (5) and is dimensioned such that the rear portion of the associated loudspeaker (2) can be inserted thereinto, and the loudspeaker attachment means comprise a surface mounted circumferential flange (4), and a support bearing for attachment flanges (6) of the loudspeaker (2).

4. A loudspeaker housing according to claim 3, wherein an upright circumferential side wall (8) is provided, connected on the periphery of the circumferential flange (4).

5. A loudspeaker housing according to claim 4, wherein the circumferential side wall (8) is formed with locking means (9) for fastening a loudspeaker covering (15', 15") thereto.

6. A loudspeaker housing according to claim 5, wherein the locking means are projecting prongs (9).

7. A loudspeaker housing according to claim 1 and comprising a loudspeaker covering (15') fastened to both the tubular element (1') and the panel (5').

8. A loudspeaker housing according to claim 1, wherein the tubular element (1") has a lower portion (31) which is cylindrical and an upper portion (41) which widens, and wherein the cross sectional area of the tubular element (1") above the cylindrical portion is larger than the cross sectional area of the opening of the panel (5") to form said laterally extending means.

9. A loudspeaker housing according to claim 1, wherein the connecting means comprises projecting means (10, 10').

10. A loudspeaker housing according to claim 1, wherein the connecting means comprises a thread (16") formed on the tubular element (1").

11. A loudspeaker housing according to claim 1, wherein the housing body element comprises foamed plastic material (3') which is deformable.

12. A loudspeaker housing according to claim 1, wherein the housing body element (3, 3') has an essentially tubular portion telescoped over, or slid onto the tubular element (1, 1'), and extends beyond the end portion of the tubular element (1, 1') in the region of the rear opening of the tubular element (1, 1') to define said chamber (11, 1');

and wherein those portions of the housing body element (3, 3') located adjacent to the chamber (11, 11') comprise foamed plastic material having open pores to serve as an absorption material.

13. A loudspeaker housing according to claim 12, wherein the chamber (11) extends as far as the rear portion of the body of foamed plastic material (3') and is duct or channel shaped.

14. A loudspeaker housing according to claim 12, wherein the body housing element comprises foamed plastic material (3') and has essentially closed, tubular form.

15. A loudspeaker housing according to claim 14, wherein the body of foamed plastic material (3') is formed with branches, or appendices.

16. A loudspeaker housing according to claim 1, wherein the volumes of the hollow spaces in the tubular element (1, 1') and the chamber in the body of foamed plastic material (3, 3') are matched to the characteristics of the associated loudspeaker (2, 2').

17. A loudspeaker housing according to claim 1, wherein the housing body element includes a form-sustaining body of plastic material (17").

18. A loudspeaker housing according to claim 17, wherein the housing body element has an essentially tubular portion telescoped over, or slid onto the tubular element and extends beyond the end portion of the tubular element in the region of the rear opening of the tubular element to define said chamber (11, 11').

19. A loudspeaker housing according to claim 8, wherein those portions of the housing body element located adjacent to the chamber having said foamed plastic material located therein, and said foamed plastic material comprises foamed plastic having open pores to serve as an absorption material.

* * * * *